US 9,014,712 B2

United States Patent
Tapia (10) Patent No.: US 9,014,712 B2
(45) Date of Patent: Apr. 21, 2015

(54) SELECTING AMONG SPECTRUMS WITHIN CELLS OF A WIRELESS COMMUNICATION NETWORK

(71) Applicant: T-Mobile USA, Inc., Bellevue, WA (US)

(72) Inventor: Pablo Tapia, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 195 days.

(21) Appl. No.: 13/688,163

(22) Filed: Nov. 28, 2012

(65) Prior Publication Data

US 2014/0148189 A1    May 29, 2014

(51) Int. Cl.
- *H04W 72/00* (2009.01)
- *H04W 40/00* (2009.01)
- *H04W 16/32* (2009.01)

(52) U.S. Cl.
CPC .................... *H04W 16/32* (2013.01)

(58) Field of Classification Search
CPC . H04W 72/082; H04W 84/045; H04W 16/14; H04W 24/02; H04W 72/085
USPC .................... 455/449, 452.1, 454
See application file for complete search history.

(56) References Cited

U.S. PATENT DOCUMENTS

| | | | |
|---|---|---|---|
| 7,400,903 B2 * | 7/2008 | Shoemake et al. ......... | 455/552.1 |
| 8,126,473 B1 * | 2/2012 | Kim et al. .................. | 455/452.1 |
| 2004/0203815 A1 * | 10/2004 | Shoemake et al. ........... | 455/450 |
| 2009/0059868 A1 | 3/2009 | Rajasimman et al. | |
| 2011/0205977 A1 * | 8/2011 | Gallagher et al. ............. | 370/329 |
| 2011/0287794 A1 * | 11/2011 | Koskela et al. ............... | 455/509 |
| 2011/0299511 A1 | 12/2011 | Cook | |
| 2013/0337821 A1 * | 12/2013 | Clegg ......................... | 455/452.1 |
| 2014/0043979 A1 * | 2/2014 | Etemad et al. ................ | 370/237 |

FOREIGN PATENT DOCUMENTS

| | | |
|---|---|---|
| KR | 1020100069063 | 6/2010 |
| KR | 1020120029249 | 3/2012 |
| WO | WO2012070855 | 5/2012 |

OTHER PUBLICATIONS

The PCT Search Report and Written Opinion mailed Mar. 27, 2014 for PCT application No. PCT/US13/71530, 15 pages.

* cited by examiner

*Primary Examiner* — Nathan Mitchell
(74) *Attorney, Agent, or Firm* — Lee & Hayes, PLLC (57) ABSTRACT

A method of managing signals within a wireless network that comprises at least one macro cell, wherein the macro cell comprises at least one base station and a plurality of pico cells, and wherein each pico cell comprises an access point in communication with the at least one base station. The method includes selecting a spectrum to use for transmission of signals within a corresponding pico cell, wherein the spectrum that is selected is one of (i) a spectrum licensed for wireless communication, and (ii) a spectrum that is unlicensed. Signals within the corresponding are then transmitted and received over the selected spectrum.

27 Claims, 4 Drawing Sheets

SELECTING AMONG SPECTRUMS WITHIN CELLS OF A WIRELESS COMMUNICATION NETWORK

BACKGROUND

In recent years, telecommunication devices have advanced from offering simple voice calling services within wireless networks to providing users with many new features. Telecommunication devices now provide messaging services such as email, text messaging, and instant messaging; data services such as Internet browsing; media services such as storing and playing a library of favorite songs; location services; and many others. In addition to the new features provided by the telecommunication devices, users of such telecommunication devices have greatly increased. Such increase in users is only expected to continue and in fact, it is expected that there could be a growth rate of twenty times more users in the next few years alone. Such an increase in wireless traffic has no place to go and thus, the performance of wireless networks will suffer.

It has been determined that a big difference in performance of wireless networks can be achieved by moving users closer to base stations that handle the traffic within the wireless networks. Generally, the base stations control telecommunication device traffic within a macro cell. Those macro cells usually include a single base station. The closer a user is to the base station, the more efficient the service provided to the user. For example, a user close to the edge of the macro cell may achieve only five megabits (Mb) per second of performance with a telecommunication device, while a user closer to the base station may achieve a 50 Mb per second performance with a telecommunication device.

To help address such performance issues within wireless networks, heterogeneous networks have been created. In such heterogeneous networks, the macro cells are divided into smaller cells generally referred to as pico cells. Each macro cell is still controlled by a high power node or base station, while the pico cells are controlled by lower power nodes or access points. The access points control traffic of telecommunication devices within their corresponding pico cells. The access points communicate with the base stations via a wired connection, for example, fiber optics, hard wired technology, etc. However, the telecommunication devices still communicate with the access points over a standard, licensed frequency or spectrum and thus, the continued growth and increase in traffic will cause more interference and thus, quality of service will continue to suffer.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein is a wireless communication network that includes architecture for selecting a frequency or spectrum to use for transmission of signals within a pico cell located within a micro cell of the wireless network. The spectrum is selected from (i) spectrums licensed for wireless communication and (ii) spectrums that are unlicensed. For example, an access point within the pico cell may select a spectrum to use for transmission of signals within its corresponding pico cell, wherein the selected spectrum is one of a spectrum licensed for wireless communication, and a spectrum that is unlicensed. The access point transmits signals via the spectrum that is selected to one or more user devices located within the corresponding pico cell, and also receives signals via the spectrum that is selected from the one or more user devices located within the corresponding pico cell. The apparatuses, networks and methods described herein are applicable to apparatuses, networks, and methods that operate in accordance with, for example, $3^{rd}$ Generation Partnership Project (3GPP) standards, $4^{th}$ Generation or Long Term Evolution (LTE) standards, etc. However, the apparatuses, networks and methods described herein are not limited to apparatuses, networks and methods that operate in accordance with 3GPP, 4G or LTE standards.

In an embodiment, once the spectrum has been selected, the access point may continuously or periodically evaluate the spectrum that is selected and based upon the evaluation, determine that there is a need to change channels within the spectrum for transmission of signals within the pico cell. The access point then informs the user devices within the corresponding pico cell to change channels. This can be accomplished by informing the user devices to change channels in a certain amount of time or at a specific time. Alternatively, in an embodiment, the access point may hand off the user devices to the base station of the macro cell within which the pico cell is included. The access point will then change channels within the spectrum and then receive back the user devices from the base station.

In a similar manner, the access point, based upon evaluating the spectrum that is selected, may determine that a new spectrum for transmission of signals within the pico cell is needed. The spectrum once again may be selected from either spectrums that are licensed for wireless communication or from unlicensed spectrums. The access point may inform the user devices within the corresponding pico cell that the new spectrum will be utilized after a certain amount of time passes or at a preset time. Alternatively, the access point may once again hand off the user devices to the base station, change to the new spectrum, and then receive back the user devices from the base station.

Since it is generally quicker and easier to change channels within a spectrum, in most embodiments, the access point will try and evaluate the various channels within a spectrum that is currently being used for transmission of signals within the pico cell before changing spectrums.

In accordance with various embodiments, certain user devices within the pico cell, and/or certain signals transmitted within the corresponding pico cell, may be selected for using a particular spectrum. For example, certain user devices may be selected for always utilizing a licensed spectrum. Likewise, voice signals may be selected for transmission over a licensed spectrum within the corresponding pico cell, while data signals may be selected for transmission over an unlicensed spectrum.

Example Operating Environment

Figure 1:
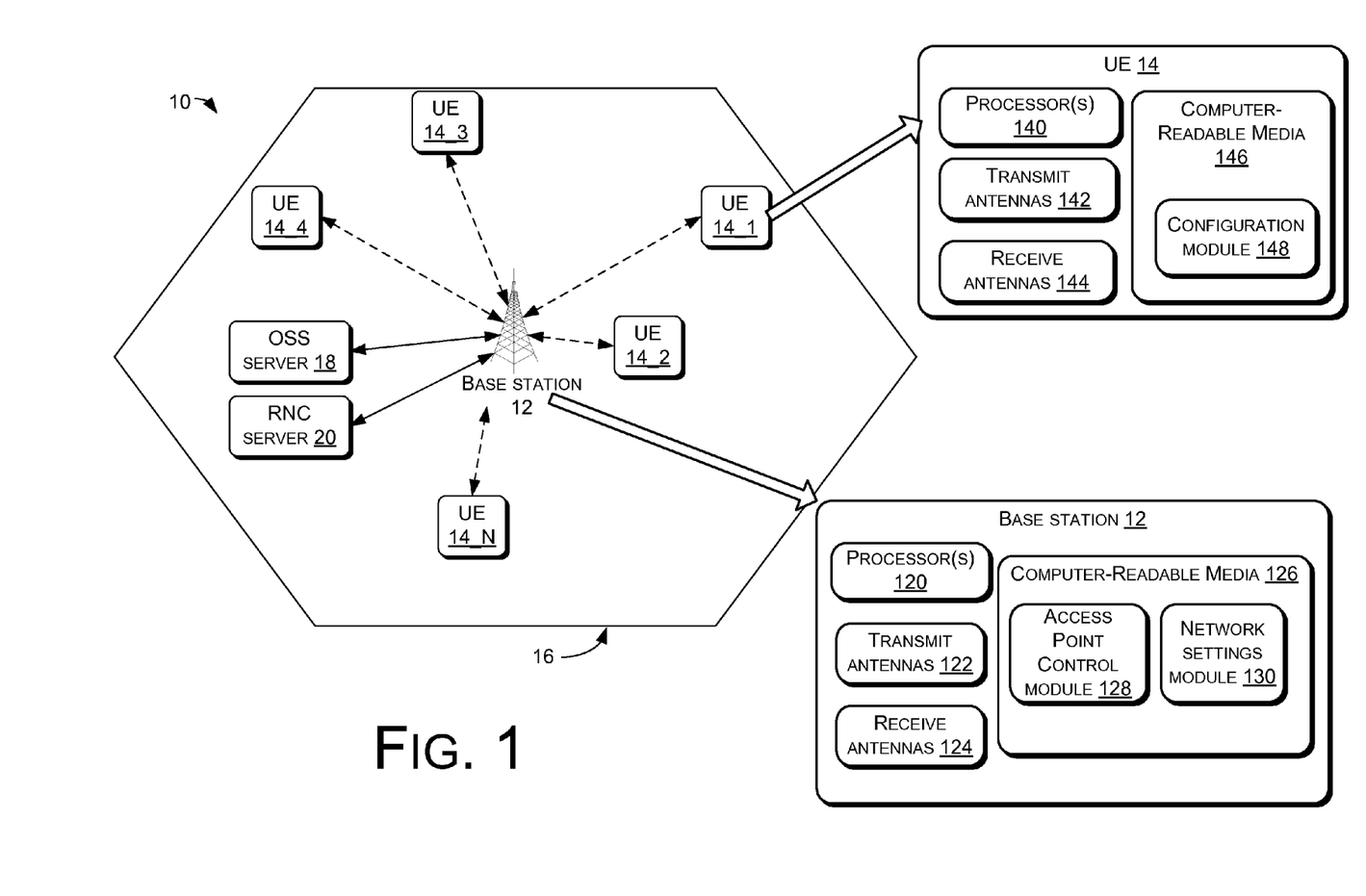
FIG. 1 illustrates a wireless communication network, in accordance with various embodiments.

FIG. 1 illustrates a wireless communication network 10 (also referred to herein as network 10). The network 10 comprises a base station (BS) 12 communicatively coupled to a plurality of user devices, referred to as UEs 14_1, 14_2, ..., 14_N, where N is an appropriate integer. The BS 12 serves UEs 14 located within a geographical area, e.g., within a macro cell 16. FIG. 1 illustrates the macro cell 16 to be hexagonal in shape, although other shapes of the macro cell 16 may also be possible. In general, the network 10 comprises a plurality of macro cells 16, with each macro cell 16 including one or more BSs 12.

In an embodiment, the UEs 14_1, ..., 14_N may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, integrated devices combining one or more of the preceding devices, and/or the like. As such, UEs 14_1, ..., 14_N may range widely in terms of capabilities and features. For example, one of the UEs 14_1, ..., 14_N may have a numeric keypad, a capability to display only a few lines of text and be configured to interoperate with only Global System for Mobile Communications (GSM) networks. However, another of the UEs 14_1, ..., 14_N (e.g., a smart phone) may have a touch-sensitive screen, a stylus, an embedded GPS receiver, and a relatively high-resolution display, and be configured to interoperate with multiple types of networks. UEs 14_1, ..., 14_N may also include SIM-less devices (i.e., mobile devices that do not contain a functional subscriber identity module ("SIM")), roaming mobile devices (i.e., mobile devices operating outside of their home access networks), and/or mobile software applications.

In an embodiment, the BS 12 may communicate voice traffic and/or data traffic with one or more of the UEs 14_1, ..., 14_N. The BS 12 may communicate with the UEs 14_1, ..., 14_N using one or more appropriate wireless communication protocols or standards. For example, the BS 12 may communicate with the UEs 14_1, ..., 14_N using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 12 may be communicatively coupled (e.g., using a backhaul connection, illustrated using solid lines in FIG. 1) to a number of backhaul equipments, e.g., an operation support subsystem (OSS) server 18, a radio network controller (RNC) 20, and/or the like. The RNC 20 can also be in the form of a mobility management entity when the wireless communication network 10 operates according to the long term evolution (LTE) standard or LTE Advanced standard.

In an embodiment, the base station 12 may comprise processors 120, one or more transmit antennas (transmitters) 122, one or more receive antennas (receivers) 124, and computer-readable media 126. The processors 120 may be configured to execute instructions, which may be stored in the computer-readable media 126 or in other computer-readable media accessible to the processors 120. In some embodiments, the processors 120 are a central processing unit (CPU), a graphics processing unit (GPU), or both CPU and GPU, or any other sort of processing unit. The base station 12 can also be in the form of a Node B (where the wireless communication network 10 is 3G UMTS network) or in the form of an eNode B (where the wireless communication network 10 operates according to the LTE standard or LTE Advanced standard).

The one or more transmit antennas 122 may transmit signals to the UEs 14_1, ..., 14_N, and the one or more receive antennas 124 may receive signals from the UEs 14_1, ..., 14_N. The antennas 122 and 124 include any appropriate antennas known in the art. For example, antennas 122 and 124 may include radio transmitters and radio receivers that perform the function of transmitting and receiving radio frequency communications. In an embodiment, the antennas 122 and 124 may be included in a transceiver module of the BS 12.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the base station 12. The computer-readable media 126 may reside within the base station 12, on one or more storage devices accessible on a local network to the base station 12, on cloud storage accessible via a wide area network to the base station 12, or in any other accessible location.

The computer-readable media 126 may store modules, such as instructions, data stores, and so forth that are configured to execute on the processors 120. For instance, the computer-readable media 126 may store an access point control module 128 and a network settings module 130, as will be discussed in more detail herein later.

Although FIG. 1 illustrates the computer-readable media 126 in the BS 12 storing the access point control module 128 and the network settings module 130, in various other embodiments, the access point control module 128, the network settings module 130, and one or more other modules (not illustrated, may be stored in another component of the network 10 (e.g., other than the BS 12). For example, one or more of these modules may be stored in a computer-readable media included in the OSS server 18, the RNC 20, another appropriate server associated with the network 10, and/or the like.

Although not illustrated in FIG. 1, various other modules (e.g., an operating system module, basic input/output systems (BIOS), etc.) may also be stored in the computer-readable media 126. Furthermore, although not illustrated in FIG. 1, the base station 12 may comprise several other components, e.g., a power bus configured to supply power to various components of the base station 12, one or more interfaces to communicate with various backhaul equipments, and/or the like.

In an embodiment, the UEs 14 may comprise processors 140, one or more transmit antennas (transmitters) 142, one or more receive antennas (receivers) 144, and computer-readable media 146. The processors 140 may be configured to execute instructions, which may be stored in the computer-readable media 146 or in other computer-readable media accessible to the processors 140. In some embodiments, the processors 140 is a central processing unit (CPU), a graphics processing unit (GPU), or both CPU and GPU, or any other sort of processing unit. The one or more transmit antennas 142 may transmit signals to the base station 12, and the one or more receive antennas 144 may receive signals from the base station 12. In an embodiment, the antennas 142 and 144 may be included in a transceiver module of the UE 14.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 14.

The computer-readable media 146 may store several modules, such as instructions, data stores, and so forth that are configured to execute on the processors 140. For instance, the computer-readable media 140 may store a configuration module 148. Although not illustrated in FIG. 1, the computer-readable media 146 may also store one or more applications configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 12, other UEs, etc.).

Although not illustrated in FIG. 1, the UEs 14 may also comprise various other components, e.g., a battery, a charging unit, one or more network interfaces, an audio interface, a display, a keypad or keyboard, a GPS receiver and/or other location determination component, and other input and/or output interfaces.

Although FIG. 1 illustrates only one UE (UE 14_1) in detail, each of the UEs 14_2, . . . , 14_N may have a structure that is at least in part similar to that of the UE 14_1. For example, similar to the UE 14_1, each of the UEs 14_2, . . . , 14_N may comprise processors, one or more transmit antennas, one or more receive antennas, and computer-readable media including a configuration module.

In an embodiment, the network settings module 130 stored in the computer-readable media 126 maintains a plurality of network settings associated with the network 10. Individual network settings maintained by the network settings module 130 may be pertinent to a single UE of the UEs 14_1, . . . , 14_N, a subset of the UEs 14_1, . . . , 14_N, or each of the UEs 14_1, . . . , 14_N. For example, a network setting of the plurality of network settings may specify a maximum bit rate at which a UE (or each of the UEs 14_1, . . . , 14_N) may transmit data to the BS 12. Another network setting of the plurality of network settings may specify a transmit time interval (tti) used by each of the UEs 14_1, . . . , 14_N to transmit data to the BS 12. Yet another network setting of the plurality of network settings may specify a maximum power that each of the UEs 14_1, . . . , 14_N may use to transmit data to the BS 12. The plurality of network settings maintained by the network settings module 130 may also include any other appropriate type of network settings.

In an embodiment, one or more of the plurality of network settings maintained by the network settings module 13 may be communicated to the UEs 14_1, . . . , 14_N (e.g., by the transmit antennas 122 to the receive antennas 144 of the UEs 14_1, . . . , 14_N). Based on receiving the network settings, the UEs 14_1, . . . , 14_N (e.g., the corresponding configuration modules 148) may configure themselves and communicate with the BS 12 accordingly.

Figure 2:
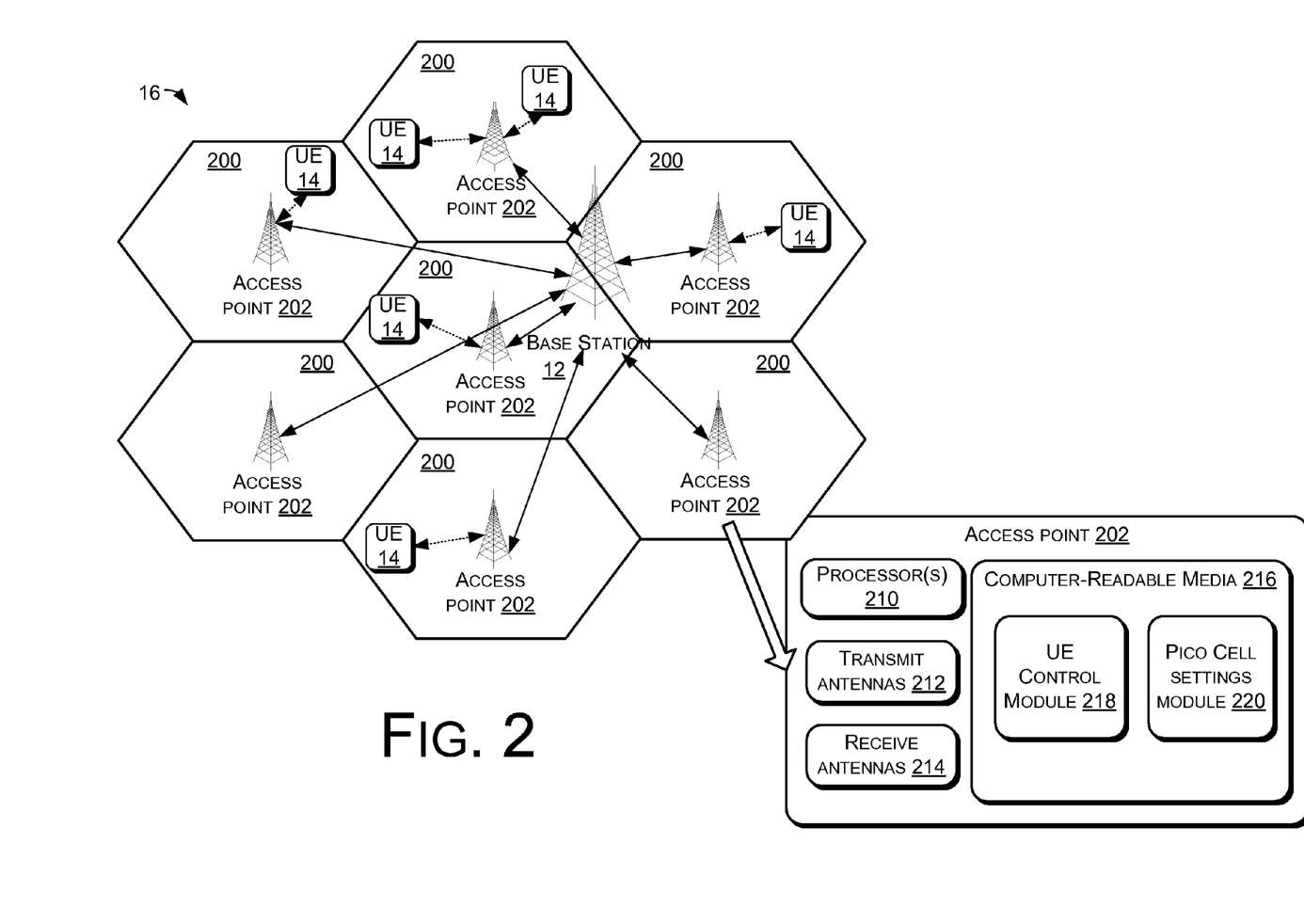
FIG. 2 illustrates a macro cell of the wireless network of FIG. 1 divided into a plurality of pico cells, in accordance with various embodiments.

FIG. 2 illustrates the macro cell 16 arranged as a heterogeneous network. The macro cell 16 is divided into a plurality of smaller cells referred to as pico cells 200. Each pico cell 200 includes an access point 202, which is generally a lower power node with respect to the BS 12, which serves as a higher power node for the network 10. Each access point 202 controls and handles transmission of signals within a corresponding pico cell 200. While the macro cell 16 is illustrated as including six pico cells 200, more or fewer pico cells 200 may be included.

As with the BS 12, in an embodiment, each access point 202 may communicate voice traffic and/or data traffic with one or more of the UEs 14 that are located within its corresponding pico cell 200. The access point 200 may communicate with the UEs 14 using one or more appropriate wireless communication protocols or standards. For example, the access point 200 may communicate with the UEs 14 using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The access points 202 are generally communicatively coupled (e.g., using a backhaul connection, illustrated using solid lines in FIG. 2) to the BS 12. The backhaul connection may include a fiber optic communication channel, a hard wire communication channel, etc.

In an embodiment, the access points 202 may comprise processors 210, one or more transmit antennas 212, one or more receive antennas 214, and computer-readable media 216. The processors 210 may be configured to execute instructions, which may be stored in the computer-readable media 216 or in other computer-readable media accessible to the processors 210. In some embodiments, the processors 210 are a central processing unit (CPU), a graphics processing unit (GPU), or both CPU and GPU, or any other sort of processing unit.

The one or more transmit antennas 212 may transmit signals to the UEs 14, and the one or more receive antennas 214 may receive signals from the UEs 14. The antennas 212 and 214 include any appropriate antennas known in the art. For example, antennas 212 and 214 may include radio transmitters and radio receivers that perform the function of transmitting and receiving radio frequency communications. In an embodiment, the antennas 212 and 214 may be included in a transceiver module of the access points 202.

The computer-readable media 216 for each access point 202 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the access point 202. The computer-readable media 216 may reside within the access point 202, on one or more storage devices accessible on a local network to the access point 202, on cloud storage accessible via a wide area network to the access point 202, or in any other accessible location.

The computer-readable media 216 may store modules, such as instructions, data stores, and so forth that are configured to execute on the processors 210. For instance, the computer-readable media 216 may store a UE control module 218 and a pico cell settings module 220, as will be discussed in more detail herein later.

Although not illustrated in FIG. 2, various other modules (e.g., an operating system module, basic input/output systems (BIOS), etc.) may also be stored in the computer-readable media 216. Furthermore, although not illustrated in FIG. 2, each access point 202 may comprise several other components, e.g., a power bus configured to supply power to various components of the access point 202, one or more interfaces to communicate with various backhaul equipments, and/or the like.

In an embodiment, the pico cell settings module 220 stored in the computer-readable media 216 maintains a plurality of pico cell settings associated with a corresponding pico cell 200. Individual pico cell settings maintained by the pico cell settings module 220 may be pertinent to a single UE of the UEs 14, a subset of the UEs 14, or each of the UEs 14. For example, a pico cell setting of the plurality of pico cell settings may specify a maximum bit rate at which a UE (or each of the UEs 14) may transmit data to the corresponding access point 200. Another pico cell setting of the plurality of pico cell settings may specify a transmit time interval (tti) used by each of the UEs 14 to transmit data to the corresponding access point 200. Yet another pico cell setting of the plurality of pico cell settings may specify a maximum power that each of the UEs 14 may use to transmit data to the corresponding access point 200. Another pico cell setting may include a frequency or spectrum to sue for transmission and reception of signals within the corresponding pico cell 200, as well as a channel within the spectrum. The plurality of network settings maintained by the pico cell settings module 220 may also include any other appropriate type of pico cell settings.

In an embodiment, one or more of the plurality of pico cell settings maintained by the pico cell settings module 220 may be communicated to the UEs 14 (e.g., by the transmit antenna 212 to the configuration modules 148 of the UEs 14). Based on receiving the pico cell settings, the UEs 14 (e.g., the corresponding configuration modules 148) may configure themselves and communicate with the corresponding access point 200 accordingly.

In an embodiment, the access point control module 128 of the BS 12 controls the access points 200. For example, the access point control module 128 may provide procedures for communicating with the BS 12, procedures for handing off UEs 14 to the BS 12, procedures for handing off UEs among the various pico cells 200 and access points 202, etc. Likewise, the UE control module 218 of the access points controls the UEs 14 within the respective pico cells. For example, the UE control module 218 may provide procedures for communicating with the corresponding access point 200, procedures for handing off UEs 14 to the BS 12, procedures for handing off UEs among the various pico cells 200 and access points 202, etc.

Example Operations

In operation, UEs 14 generally move around within the network 10 among various macro cells 16. The UEs 14 also generally move around within a particular macro cell 16 among the various pico cells 200. When a UE 14 wishes to transmit a signal, or is set to receive a signal, the UE 14 transmits and/or receives such a signal from the corresponding access point 202 for the pico cell 200 in which the UE 14 is located. Generally, the access point transmits and receives signals over a particular spectrum. Generally, the spectrum is a spectrum that is licensed by the Federal Communications Commission (FCC) in the United States (or the FCC's equivalent in other countries) for use within a wireless communication network. For example, a licensed spectrum includes, for example, the 3GPP Band II, i.e. 1.9/2.1 GHz. Upon entry into the particular pico cell 200, the pico cell settings module 220 of the corresponding access point 202 may inform the configuration module 148 of the UE 14 of the spectrum that should be utilized for transmission and reception of signals between the access point 202 and the UE 14.

In order to provide a better quality of service (QoS) for transmission of signals within the pico cell 200, the access point 202 may decide to utilize a different spectrum or a different channel within the spectrum currently being utilized. Generally each wireless network 10 can operate in multiple licensed spectrums for transmission. However, the access point 202 may decide to switch to an unlicensed spectrum. Examples of such unlicensed spectrums include spectrums for Wi-Fi, television, etc. Examples of such unlicensed spectrums include 2.4 GHz and 5.8 GHz. The pico cell settings module 220 of the access point 202 can select an appropriate new spectrum and channel within the new spectrum for transmission of signals within the corresponding pico cell 200. The corresponding access point 202, via either the UE control module 218 or the pico cell settings module 220, can inform the UEs 14 within the corresponding pico cell 200 of the new spectrum and channel. When informing the UEs 14, the access point 202 can also inform the UEs 14 when the transition to the new spectrum and channel will occur. For example, the access point can inform the UEs 14 that the transition will occur after a certain amount of time or that the transition will occur at a certain time. Additionally, the access point 202 can hand off the UEs 14 to the base station 12 of the macro cell 16, change to the new spectrum and channel, and then receive the UEs 14 back from the base station 12. Either the base station 12 or the access point 202 can inform the UEs 14 of the new spectrum and channel.

The access point 202 and/or the UEs 14 (in which case the UEs 14 can provide information to the access point 202) can periodically or continually monitor the spectrum that is currently being used for QoS. QoS can be affected by various factors such as, for example, the amount of traffic in the network or load in the network (i.e., congestion), interference, delay, location of the cells, weather, etc. If the QoS is not acceptable, the access point 202 will first attempt to change channels within the spectrum that is currently being used in order to improve QoS. If the QoS does not improve, or if the QoS, after changing channels and improving, deteriorates once again, the access point 202 may decide to change channels once again. The pico cell settings module 220 of the access point 202 can select an appropriate new channel within the spectrum for transmission of signals within the corresponding pico cell 200. The corresponding access point 202, via either the UE control module 218 or the pico cell settings module 220, can inform the UEs 14 within the corresponding pico cell 200 of the new channel. When informing the UEs 14, the access point 202 can also inform the UEs 14 when the transition to the new channel will occur. For example, the access point can inform the UEs 14 that the transition will occur after a certain amount of time or that the transition will occur at a certain time. Additionally, the access point 202 can hand off the UEs 14 to the base station 12 of the macro cell 16, change to the new channel, and then receive the UEs 14 back from the base station 12. Either the base station 12 or the access point 202 can inform the UEs 14 of the new channel.

Once all channels within the current spectrum have been used and/or evaluated, if the QoS does not improve, or if the QoS, after changing channels and improving, deteriorates once again, the pico cell settings module 220 of the access point 202 may decide to change spectrums. If the access point 202 decides to change spectrums, the access point 202, via either the UE control module 218 or the pico cell settings module 220, will inform the UEs 14 regarding the new spectrum, as well as the channel within the spectrum, so that the UEs 14 can change accordingly. The informing of the UEs 14 can once again include an amount of time before the change will occur, a time at which the change will occur, or handing off the UEs 14 to the base station 12 and then receiving the UEs 14 back from the base station 12. Generally, it is quicker and/or easier to change channels within a spectrum in comparison to changing spectrums. The changing of channels and/or spectrums is coordinated by the access point 202 with the base station 12.

In an embodiment, certain UEs 14 may always be transmitting and receiving over a licensed spectrum, regardless of the spectrum being utilized within a pico cell 200 in which the UEs 14 are located. Thus, in such an embodiment, the access point 202 may include multiple transmitters so that the access point 202 can transmit and receive over multiple spectrums and/or channels. UEs 14 may also need to be able to transmit and receive over multiple spectrums and channels. Alternatively, the UEs 14 may not communicate with the access point 202 in the corresponding pico cell 200, but rather may communicate with the base station 12.

In accordance with various embodiments, certain types of signals may always be transmitted utilizing a particular spectrum. For example, voice signals may always be transmitted over a licensed spectrum, while data signals may be transmitted over an unlicensed spectrum if the access point 202 within a pico cell 200 determines that an unlicensed spectrum is preferable for QoS. Once again, in such an embodiment, the access point 202 will include multiple transmitters so that the access point can transmit and receive over multiple spectrums and/or channels. UEs 14 will also need to be able to transmit and receive over multiple spectrums and channels. Alternatively, voice signals within such a pico cell 200 may be handled by the base station 12, while the access point 202 handles the data signals. Factors that may influence whether or not certain UEs 14 and/or types of signals utilize a particular spectrum can include, for example, cost issues, security issues, etc.

Accordingly, UEs 14 will move among macro cells 16 and thus, move around pico cells 200 within the macro cells 16. The access points 202 will hand the UEs 14 off to other access points 202 as the UEs 14 move into different pico cells 200. When UEs 14 are handed off to another access point 202, that particular access point 202, via, for example, it's pico cell settings module 220, will inform the UEs 14 as to various factors, including the spectrum and channel within the spectrum that is currently being utilized for transmission of signals within the pico cell 200. The UE's configuration module 148 will configure the UE 14 accordingly. If the access point 202 decides to change the channel and/or spectrum as previously described, then the pico cell settings module 220 of the access point 202.

Example Processes

Figure 3:
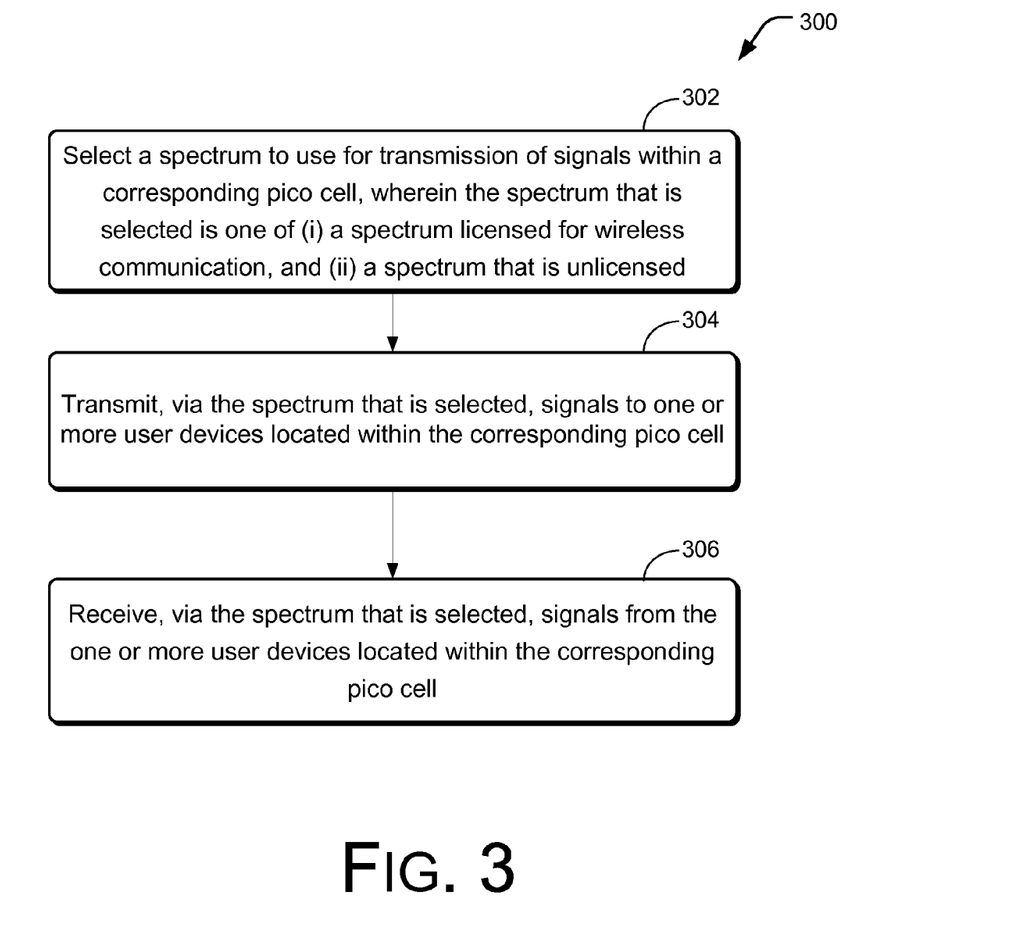
FIG. 3 is a flowchart illustrating a method of managing signals within a pico cell of FIG. 2.
Figure 4:
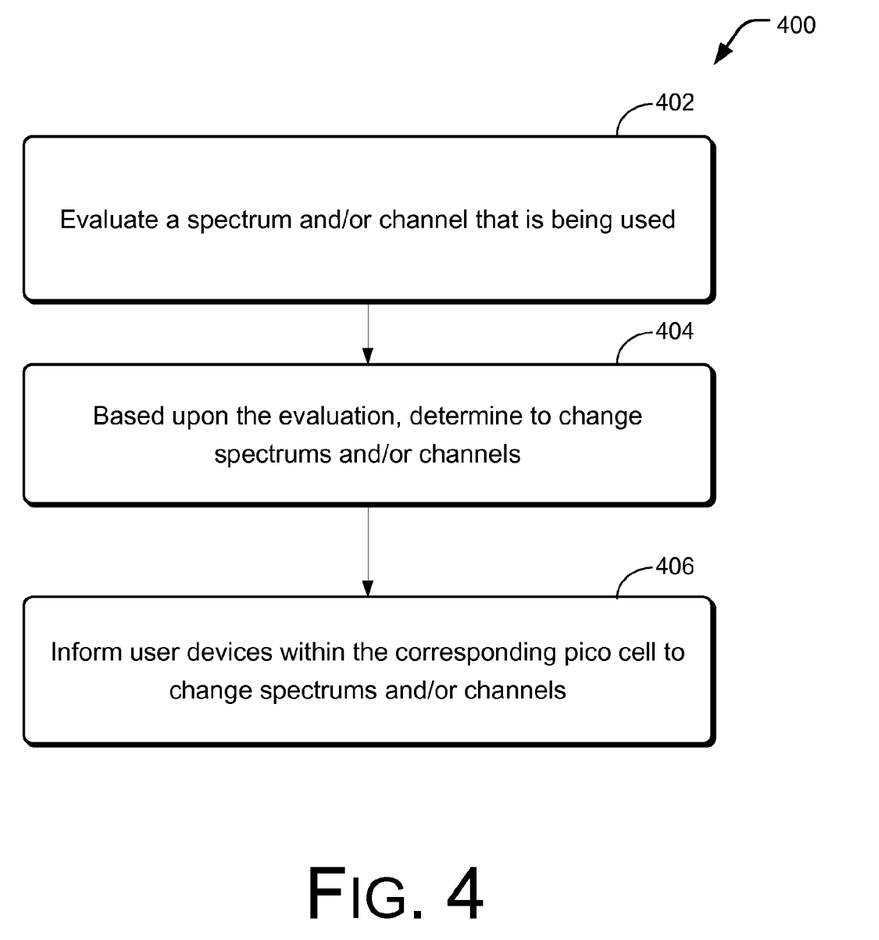
FIG. 4 is a flowchart illustrating a method of evaluating a spectrum and/or channels within the spectrum being used within a corresponding pico cell of a macro cell of a wireless communication network, in accordance with various embodiments.

FIGS. 3 and 4 are flow diagrams of illustrative processes that may be implemented within the wireless network 10. These processes (as well as other processes described throughout) are illustrated as logical flow graphs, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processors and processing cores in other environments and computing devices.

FIG. 3 is a flowchart illustrating a method 300 of managing signals within a wireless network that comprises at least one macro cell, wherein the macro cell comprises at least one base station and a plurality of pico cells, and wherein each pico cell comprises an access point in communication with the at least one base station, in accordance with various embodiments. As illustrated at block 302, an access point selects a spectrum to use for transmission of signals within a corresponding pico cell, wherein the spectrum that is selected is one of (i) a spectrum licensed for wireless communication, and (ii) a spectrum that is unlicensed. At block 304, the access point transmits, via the spectrum that is selected, signals to one or more user devices located within the corresponding pico cell. At block 306, the access point receives, via the spectrum that is selected, signals from the one or more user devices located within the corresponding pico cell.

FIG. 4 is a flowchart illustrating a method 400 of evaluating a spectrum and/or channels within the spectrum being used within a corresponding pico cell of a macro cell of a wireless communication network, in accordance with various embodiments. As illustrated at block 402, an access point evaluates a spectrum and/or channel that is being used. At block 404, based upon the evaluation at block 402, the access point determines to change spectrums and/or channels. At block 406, the access point informs user devices within the corresponding pico cell to change spectrums and/or channels.

While the techniques, operations and processes described herein have been described with respect to pico cells within a macro cell of a wireless network, it is to be understood that the techniques, operations and processes described herein can be used with any type of cell, access point and base station within a wireless network. For example, the techniques, operations and processes described herein can be used with respect to a macro cell, a base station and user devices within the macro cell without the use of pico cells and/or access points. Additionally, base stations can serve as or include access points.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A method comprising:
    selecting, by a corresponding access point within a corresponding cell of a wireless network, a spectrum to use for transmission of signals within the corresponding cell, wherein the spectrum that is selected is one of (i) a spectrum licensed for wireless communication, and (ii) a spectrum that is unlicensed;
    transmitting, by the corresponding access point via the spectrum that is selected, signals to one or more user devices located within the corresponding cell;
    receiving, by the corresponding access point via the spectrum that is selected, signals from the one or more user devices located within the corresponding cell;
    determining, by the corresponding access point, that an additional user device within the corresponding cell should only operate on a licensed spectrum; and
    in response to the spectrum that is selected being an unlicensed spectrum, handing off the additional user device to a corresponding base station of the wireless network.

2. The method of claim 1, further comprising:
    evaluating, by the corresponding access point, the spectrum that is selected;
    based upon the evaluating, determining, by the corresponding access point, to change channels within the spectrum that is selected; and
    informing, by the corresponding access point, user devices within the corresponding cell to change channels.

3. The method of claim 2, wherein informing user devices within the corresponding cell to change channels comprises informing user devices within the corresponding cell to one of (i) change channels in a certain amount of time, or (ii) change channels at a certain time.

4. The method of claim 2, wherein informing user devices within the corresponding cell to change channels comprises:
    handing off, by the corresponding access point, the user devices to a corresponding base station within the wireless network;
    changing, by the corresponding access point, channels within the spectrum that is selected; and
    receiving, by the corresponding access point, user devices within the corresponding cell back from the corresponding base station.

5. The method of claim 1, further comprising:
    evaluating, by the corresponding access point, the spectrum that is selected;
    based upon the evaluating, determining, by the corresponding access point, to change spectrums;
    selecting, by the corresponding access point, a new spectrum to use for transmission of signals within a corresponding cell, wherein the new spectrum that is selected is one of (i) a spectrum licensed for wireless communication, and (ii) a spectrum that is unlicensed; and
    informing, by the corresponding access point, user devices within the corresponding cell to change spectrums to the new spectrum that is selected.

6. The method of claim 5, wherein informing user devices within the corresponding cell to change spectrums comprises informing user devices within the corresponding cell to one of (i) change spectrums in a certain amount of time, or (ii) change spectrums at a certain time.

7. The method of claim 5, wherein informing user devices within the corresponding cell to change spectrums comprises:
    handing off, by the corresponding access point, the user devices to a corresponding base station within the wireless network;
    changing, by the corresponding access point, to the new spectrum that is selected; and
    receiving, by the corresponding access point, user devices within the corresponding pico cell back from the corresponding base station.

8. The method of claim 1, wherein:
    the spectrum that is selected is an unlicensed spectrum; and
    the transmitting and the receiving comprise transmitting and receiving data signals.

9. The method of claim 8, further comprising:
    transmitting, by the corresponding access point via a spectrum that is licensed for wireless communication, voice signals to one or more user devices located within the corresponding cell; and
    receiving, by the corresponding access point via the spectrum that is licensed for wireless communication, voice signals from the one or more user devices located within the corresponding cell.

10. The method of claim 1, wherein selecting the spectrum to use for transmission is based upon at least one of an amount of traffic in the wireless network, load in the wireless network, interference, delay, location of the cells, and/or weather.

11. The method of claim 9, wherein the at least one of an amount of traffic in the wireless network, load in the wireless network, interference, delay, location of the cells, and/or weather is analyzed by one of (i) the corresponding access point or (ii) one or more user devices.

12. An apparatus comprising:
    a non-transitory storage medium; and
    instructions stored in the tangible storage medium, the instructions being executable by the apparatus to
        select a spectrum to use for transmission of signals within a corresponding cell within a wireless network, wherein the spectrum that is selected is one of (i) a spectrum licensed for wireless communication, and (ii) a spectrum that is unlicensed;
        transmit, via the spectrum that is selected, signals from a corresponding access point to one or more user devices located within the corresponding cell;
        receive, via the spectrum that is selected, signals at the corresponding access point from the one or more user devices located within the corresponding cell;
        determine that an additional user device within the corresponding cell should only operate on a licensed spectrum; and
        in response to the spectrum that is selected being an unlicensed spectrum, hand off the additional user device to a corresponding base station of the wireless network.

13. The apparatus of claim 12, wherein the instructions are further executable by the apparatus to:
    evaluate the spectrum that is selected;
    based upon the evaluating, determine, to change channels within the spectrum that is selected; and
    inform user devices within the corresponding cell to change channels.

14. The apparatus of claim 13, wherein inform user devices within the corresponding cell to change channels comprises informing user devices within the corresponding cell to one of (i) change channels in a certain amount of time, or (ii) change channels at a certain time.

15. The apparatus of claim 13, wherein inform user devices within the corresponding cell to change channels comprises:
    handing off the user devices to a corresponding base station within the wireless network;
    changing channels within the spectrum that is selected; and
    receiving user devices within the corresponding cell back from the corresponding base station.

16. The apparatus of claim 12, wherein the instructions are further executable by the apparatus to:
    evaluate the spectrum that is selected;
    based upon the evaluating, determine to change spectrums;
    select a new spectrum to use for transmission of signals within a corresponding cell, wherein the new spectrum is one of (i) a spectrum licensed for wireless communication, and (ii) a spectrum that is unlicensed; and
    inform user devices within the corresponding cell to change spectrums to the new spectrum that is selected.

17. The apparatus of claim 16, wherein inform user devices within the corresponding cell to change spectrums comprises informing user devices within the corresponding cell to one of (i) change spectrums in a certain amount of time, or (ii) change spectrums at a certain time.

18. The apparatus of claim 16, wherein inform user devices within the corresponding cell to change spectrums comprises:
    handing off, by the corresponding access point, the user devices to a corresponding base station within the wireless network;
    changing, by the corresponding access point, to the new spectrum that is selected; and
    receiving, by the corresponding access point, user devices within the corresponding cell back from the corresponding base station.

19. The apparatus of claim 12, wherein the instructions are further executable by the apparatus to:
    determine that at least one of the one or more user devices within the corresponding cell should only operate on a licensed spectrum; and
    in response to the spectrum that is selected being an unlicensed spectrum, hand off the at least one of the one or more user devices to a corresponding base station.

20. The apparatus of claim 12, wherein:
    the spectrum that is selected is an unlicensed spectrum; and
    the transmit and the receive comprise transmit and receive data signals.

21. The apparatus of claim 20, wherein the instructions are further executable by the apparatus to:
    transmit, via a spectrum that is licensed for wireless communication, voice signals from the corresponding access point to one or more user devices located within the corresponding cell; and
    receive, via the spectrum that is licensed for wireless communication, voice signals from the one or more user devices located within the corresponding cell.

22. The apparatus of claim 12, wherein the apparatus is the corresponding access point.

23. The apparatus of claim 12, wherein the apparatus is included within the corresponding access point.

24. The apparatus of claim 12, wherein the instructions are executable by the apparatus to select the spectrum to use for transmission based upon at least one of an amount of traffic in the wireless network, load in the wireless network, interference, delay, location of the cells, and/or weather.

25. A method comprising:
    selecting, by a corresponding access point within a corresponding pico cell of a wireless network that comprises at least one macro cell, a spectrum to use for transmission of signals within the corresponding pico cell, wherein the spectrum that is selected is one of (i) a spectrum licensed for wireless communication, and (ii) a spectrum that is unlicensed, wherein the macro cell comprises at least one base station and a plurality of pico cells, and wherein each pico cell comprises an access point in communication with the at least one base station;
    transmitting, by the corresponding access point via the spectrum that is selected, signals to one or more user devices located within the corresponding pico cell;
    receiving, by the corresponding access point via the spectrum that is selected, signals from the one or more user devices located within the corresponding pico cell;
    determining, by the corresponding access point, that an additional user device within the corresponding cell should only operate on a licensed spectrum; and
    in response to the spectrum that is selected being an unlicensed spectrum, handing off the additional user device to the base station,
    wherein selecting a spectrum to use for transmission of signals within the corresponding pico cell is coordinated by the corresponding access point with the base station.

26. The method of claim 25, further comprising:
    evaluating, by the corresponding access point, the spectrum that is selected;
    based upon the evaluating, determining, by the corresponding access point, to change channels within the spectrum that is selected; and
    informing, by the corresponding access point, user devices within the corresponding pico cell to change channels.

27. The method of claim 26, wherein informing user devices within the corresponding pico cell to change channels comprises:
    handing off, by the corresponding access point, the user devices to the at least one base station;
    changing, by the corresponding access point, channels within the spectrum that is selected; and
    receiving, by the corresponding access point, user devices within the corresponding cell back from the at least one base station.

* * * * *